United States Patent
Lei et al.

(10) Patent No.: US 12,490,208 B2
(45) Date of Patent: Dec. 2, 2025

(54) NON-CELL-DEFINING SYNCHRONIZATION SIGNAL BLOCK CONFIGURATIONS

(71) Applicant: QUALCOMM Incorporated, San Diego, CA (US)

(72) Inventors: Jing Lei, San Diego, CA (US); Yongle Wu, San Diego, CA (US); Yong Li, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 18/319,377

(22) Filed: May 17, 2023

(65) Prior Publication Data

US 2023/0379848 A1    Nov. 23, 2023

Related U.S. Application Data

(60) Provisional application No. 63/364,993, filed on May 19, 2022.

(51) Int. Cl.
    *H04W 56/00*    (2009.01)
(52) U.S. Cl.
    CPC ................... *H04W 56/001* (2013.01)
(58) Field of Classification Search
    CPC .......... H04W 56/001; H04W 56/0015
    See application file for complete search history.

(56) References Cited

U.S. PATENT DOCUMENTS

2023/0007656 A1    1/2023  Guo et al.
2023/0354225 A1*  11/2023  Kwak ................... H04W 24/08
2023/0379848 A1*  11/2023  Lei ..................... H04W 56/0015

FOREIGN PATENT DOCUMENTS

WO    WO-2021179327 A1    9/2021

OTHER PUBLICATIONS

Ericsson: "Monitoring POs in connected mode when using NCD-SSB", 3GPP TSG-RAN WG2 #117-e, Tdoc R2-2203505, 3rd Generation Partnership Project, Mobile Competence Centre, 650, Route Des Lucioles, F-06921 Sophia-Antipolis Cedex, France vol. RAN WG2, No. Electronic meeting, Feb. 21, 2022-Mar. 3, 2022, Feb. 20, 2022, pp. 1-3, XP052131219, Section 2.
International Search Report and Written Opinion—PCT/US2023/022755—ISA/EPO—Sep. 8, 2023.

* cited by examiner

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may receive a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell. The UE may receive the at least one NCD-SSB burst based at least in part on the NCD-SSB configuration. Numerous other aspects are described.

30 Claims, 9 Drawing Sheets

NON-CELL-DEFINING SYNCHRONIZATION SIGNAL BLOCK CONFIGURATIONS

CROSS-REFERENCE TO RELATED APPLICATION

This patent application claims priority to U.S. Provisional Patent Application No. 63/364,993, filed on May 19, 2022, entitled "NON-CELL-DEFINING SYNCHRONIZATION SIGNAL BLOCK CONFIGURATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for non-cell-defining synchronization signal and physical broadcast channel block configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell. The one or more processors may be configured to receive the at least one NCD-SSB burst based at least in part on the NCD-SSB configuration.

Some aspects described herein relate to a network node for wireless communication. The network node may include a memory and one or more processors coupled to the memory. The one or more processors may be configured to transmit an NCD-SSB configuration indicating one or more NCD-SSB parameters corresponding to transmission of at least one NCD-SSB associated with at least one cell, the at least one cell comprising at least one of a primary cell or a secondary cell. The one or more processors may be configured to transmit, to a UE, the at least one NCD-SSB based at least in part on the NCD-SSB configuration.

Some aspects described herein relate to a method of wireless communication performed by a UE. The method may include receiving an NCD-SSB configuration indicating one or more parameters corresponding to transmission, via at least one NCD-SSB burst, of at least one NCD-SSB set associated with at least one cell, the at least one cell comprising at least one of a primary cell or a secondary cell. The method may include receiving the at least one NCD-SSB burst based at least in part on the NCD-SSB configuration.

Some aspects described herein relate to a method of wireless communication performed by a network node. The method may include transmitting an NCD-SSB configuration indicating one or more NCD-SSB parameters corresponding to transmission of at least one NCD-SSB associated with at least one cell, the at least one cell comprising at least one of a primary cell or a secondary cell. The method may include transmitting, to a UE, the at least one NCD-SSB based at least in part on the NCD-SSB configuration.

Some aspects described herein relate to a non-transitory computer-readable medium that stores a set of instructions for wireless communication by a UE. The set of instructions, when executed by one or more processors of the UE, may cause the UE to receive an NCD-SSB configuration indicating one or more parameters corresponding to transmission, via at least one NCD-SSB burst, of at least one NCD-SSB set associated with at least one cell, the at least one cell comprising at least one of a primary cell or a secondary cell. The set of instructions, when executed by one or more processors of the UE, may cause the UE to receive the at least one NCD-SSB burst based at least in part on the NCD-SSB configuration.

Some aspects described herein relate to a non-transitory computer-readable medium that stores a set of instructions for wireless communication by a network node. The set of instructions, when executed by one or more processors of the network node, may cause the network node to transmit an NCD-SSB configuration indicating one or more NCD-SSB parameters corresponding to transmission of at least one NCD-SSB associated with at least one cell, the at least one cell comprising at least one of a primary cell or a secondary cell. The set of instructions, when executed by one or more processors of the network node, may cause the network node to transmit, to a user equipment, the at least one NCD-SSB based at least in part on the NCD-SSB configuration.

Some aspects described herein relate to an apparatus for wireless communication. The apparatus may include means for receiving an NCD-SSB configuration indicating one or more parameters corresponding to transmission, via at least one NCD-SSB burst, of at least one NCD-SSB set associated with at least one cell, the at least one cell comprising at least one of a primary cell or a secondary cell. The apparatus may include means for receiving the at least one NCD-SSB burst based at least in part on the NCD-SSB configuration.

Some aspects described herein relate to an apparatus for wireless communication. The apparatus may include means for transmitting an NCD-SSB configuration indicating one or more NCD-SSB parameters corresponding to transmission of at least one NCD-SSB associated with at least one cell, the at least one cell comprising at least one of a primary cell or a secondary cell. The apparatus may include means for transmitting, to a UE, the at least one NCD-SSB based at least in part on the NCD-SSB configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
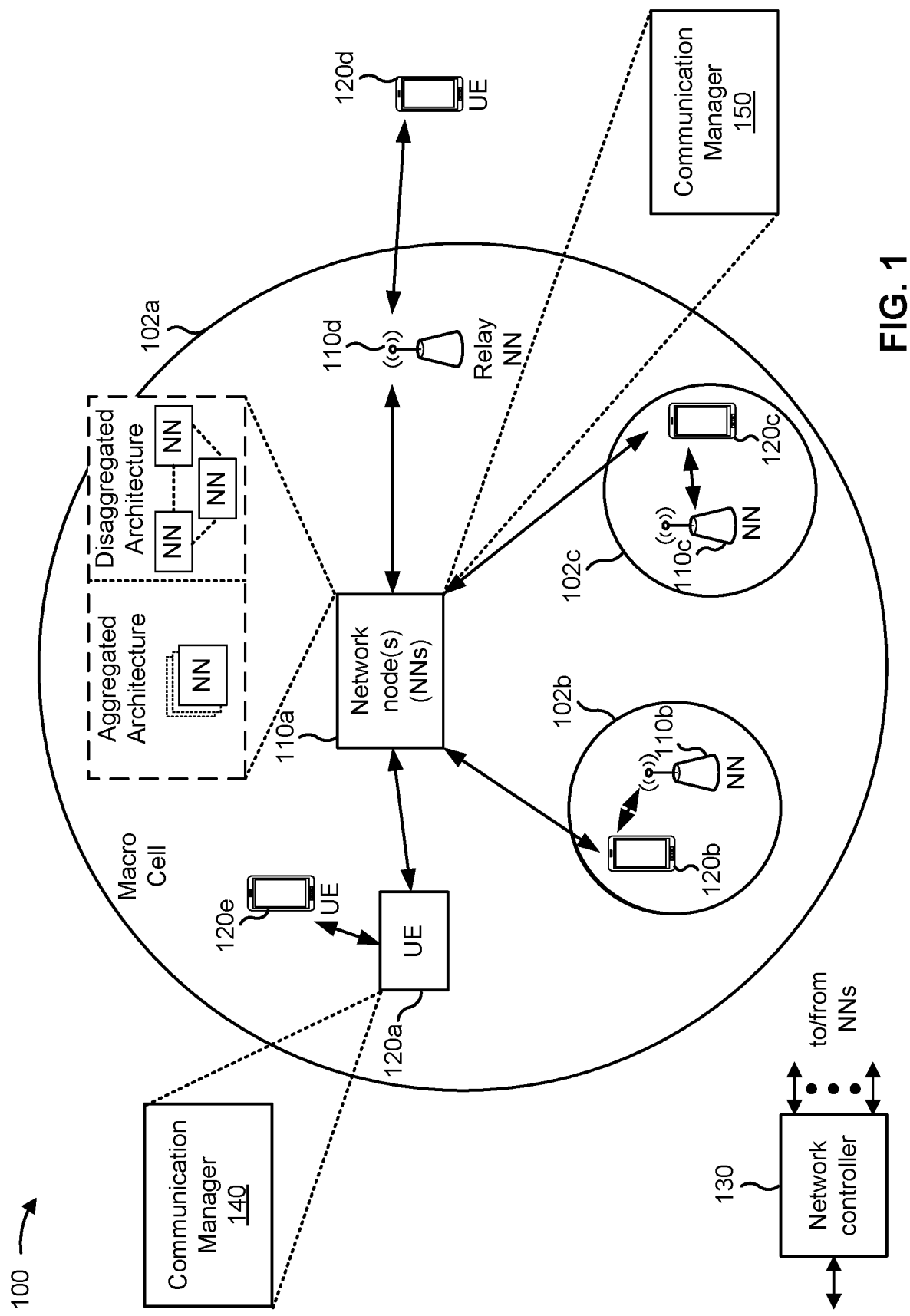
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE 120 may include a communication manager 140. As described in more detail elsewhere herein, the communication manager 140 may receive a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell; and receive the at least one NCD-SSB burst based at least in part on the NCD-SSB configuration. Additionally, or alternatively, the communication manager 140 may perform one or more other operations described herein.

In some aspects, a network node (e.g., network node 110) may include a communication manager 150. As described in more detail elsewhere herein, the communication manager 150 may transmit an NCD-SSB configuration indicating one or more NCD-SSB parameters corresponding to transmission of at least one NCD-SSB associated with at least one cell, the at least one cell comprising at least one of a primary cell or a secondary cell; and transmit, to a UE, the at least one NCD-SSB based at least in part on the NCD-SSB configuration. Additionally, or alternatively, the communication manager 150 may perform one or more other operations described herein.

As indicated above, FIG. 1 is provided as an example. Other examples may differ from what is described with regard to FIG. 1.

Figure 2:
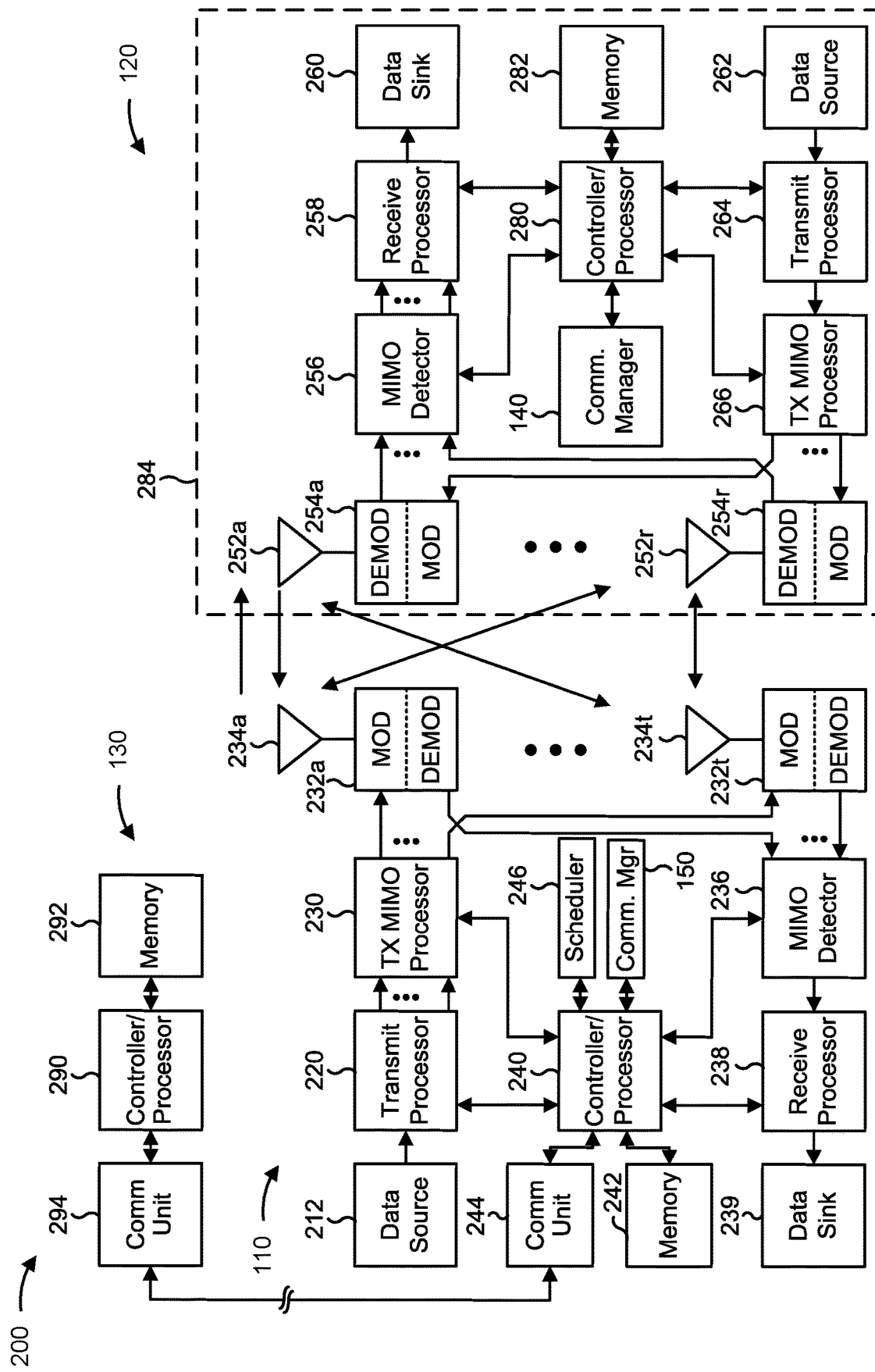
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with NCD-SSB configurations, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE includes means for receiving an NCD-SSB configuration indicating one or more parameters corresponding to transmission, via at least one NCD-SSB burst, of at least one NCD-SSB set associated with at least one cell, the at least one cell comprising at least one of a primary cell or a secondary cell; and/or means for receiving the at least one NCD-SSB burst based at least in part on the NCD-SSB configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an NCD-SSB configuration indicating one or more NCD-SSB parameters corresponding to transmission of at least one NCD-SSB associated with at least one cell, the at least one cell comprising at least one of a primary cell or a secondary cell; and/or means for transmitting, to a UE, the at least one NCD-SSB based at least in part on the NCD-SSB configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
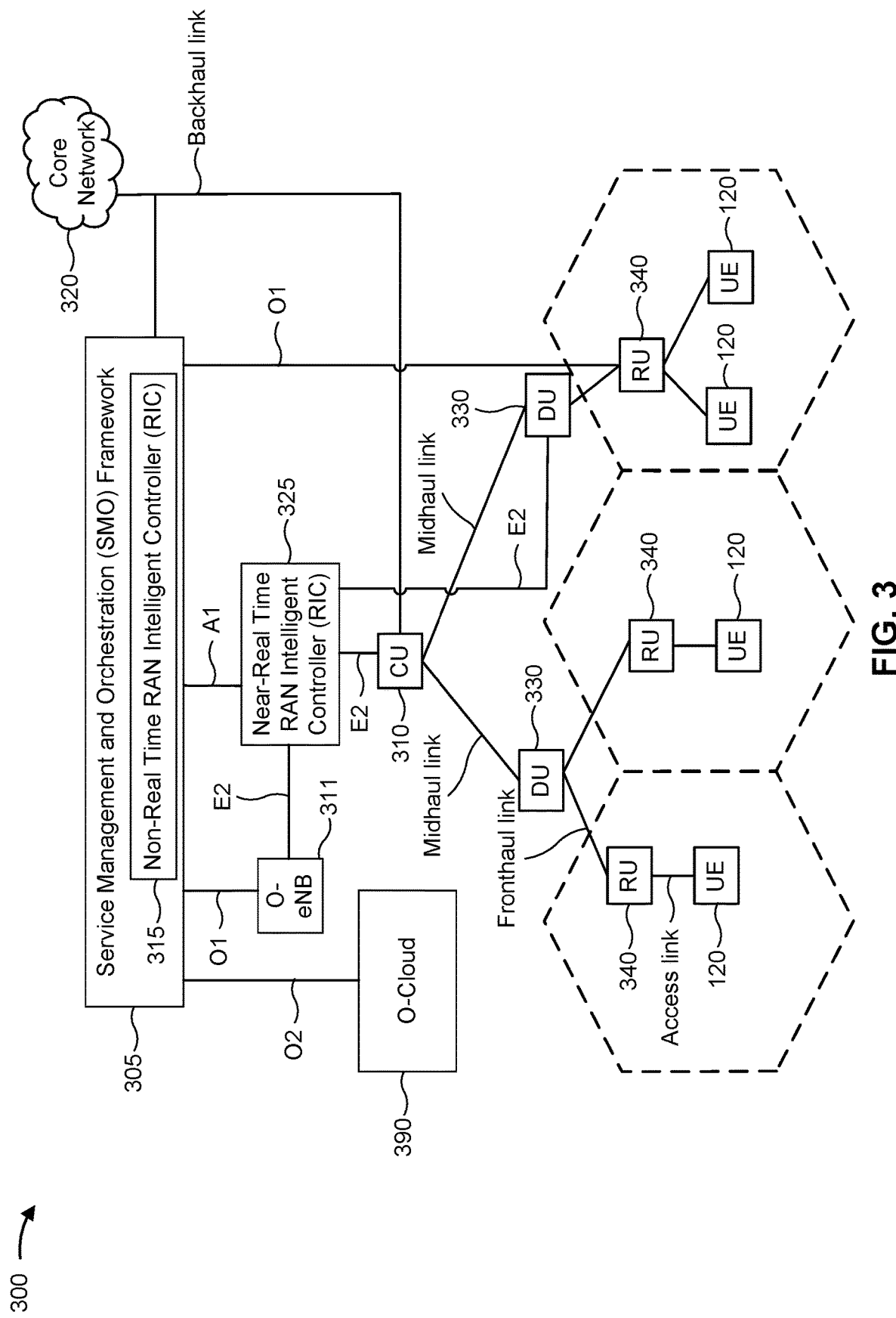
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
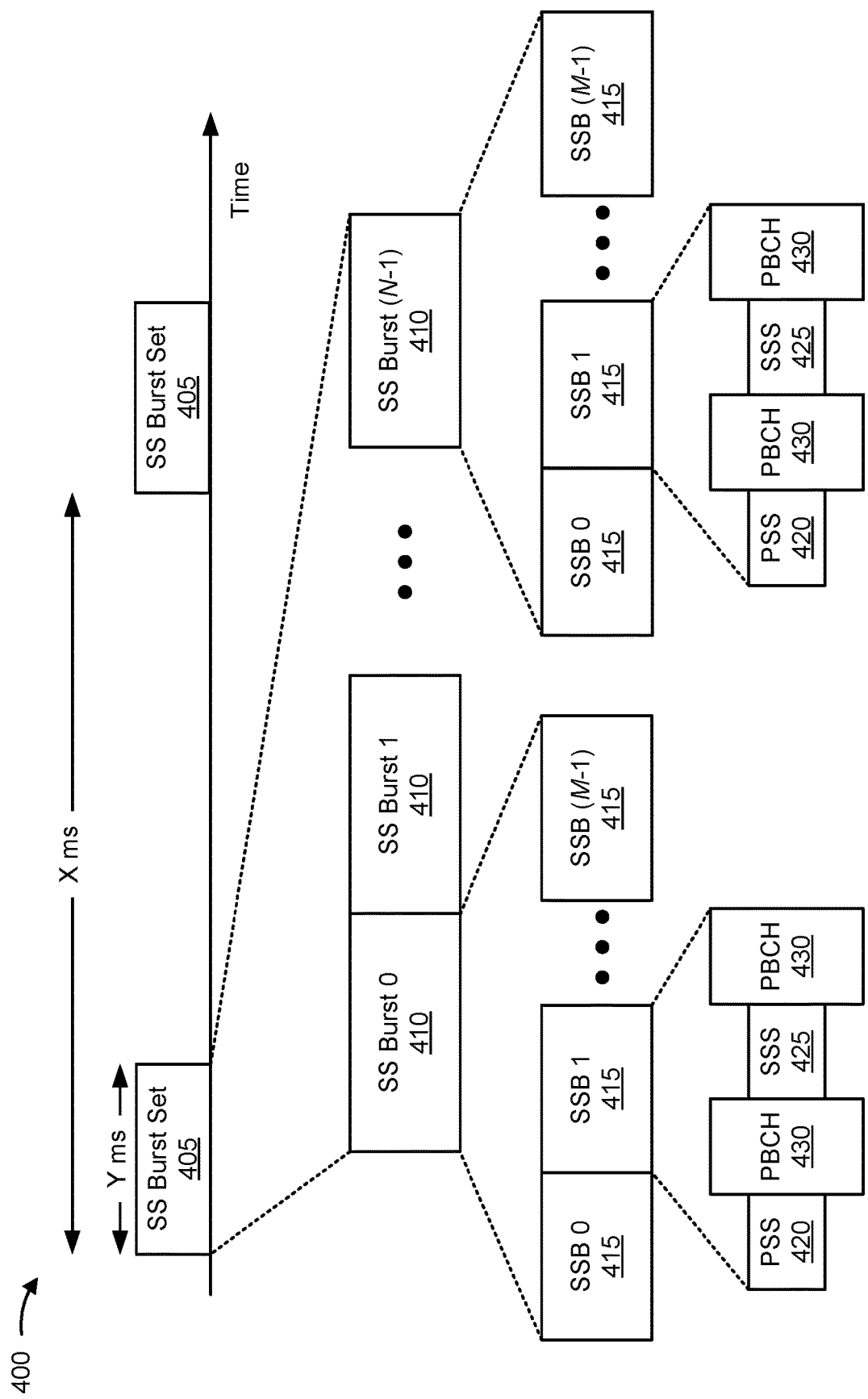
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more synchronization signal and physical broadcast channel blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a PBCH 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a network node 110. The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

In some aspects, a network node may serve different UEs of different categories and/or different UEs that support different capabilities. For example, the network node may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category and may be referred to as a reduced-capability (RedCap) UE (which may be interchangeably referred to as a reduced-capacity UE, also having the acronym "RedCap"), a low tier UE, and/or an NR-Lite UE, among other examples. A UE of the second category may be an ultra-reliable low-latency communication (URLLC) device and/or an enhanced mobile broadband (eMBB) device and may have an advanced feature set compared to RedCap UEs. RedCap UEs may include wearable devices, IoT devices, sensors, cameras, and/or the like that are associated with a limited bandwidth, power capacity, and/or transmission range, among other examples. A UE of the second category may be referred to as a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum MCS than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part (BWP) as a UE of the second category, among other examples. In some instances, the bandwidth, power capacity, computational capability, and/or transmission range of a RedCap UE may be limited or reduced relative to an eMBB UE (which may be referred to herein, interchangeably, as a "non-RedCap eMBB UE"). Similarly, a BWP, control channel, search space set, and/or bandwidth or other feature that is specific to, or otherwise dedicated for use with or by, a RedCap UE may be referred to as "RedCap-specific." A BWP, control channel, search space set, and/or bandwidth or other feature that is specific to, otherwise dedicated for use with or by, a non-RedCap UE, and/or is not RedCap-specific, may be referred to as "Non-RedCap-specific."

For FR1 time division duplexing (TDD) bands with a central bandwidth (CBW)≥50 MHz, the overhead of transmitting NCD-SSB sets can be less than 1% (of total SSB set transmission) for a typical TDD slot format having a 20 millisecond (ms) SSB periodicity and 4 or 8 beams per SSB burst. A serving cell of a RedCap UE can transmit both cell defining (CD) SSB (CD-SSB) sets and NCD-SSB sets with the same physical cell identifier (PCI). The NCD-SSB set can be quasi co-located ('QCL'ed) with a CD-SSB set having the same SSB index. An SSB set (CD or NCD) can be transmitted in an RRC-configured DL BWP of a RedCap UE which does not support un-restricted DL BWP. In some cases, mandatory eMBB UE features based on CD-SSB set can be supported by a RedCap UE using NCD-SSB sets.

In some cases, a TDD configuration (e.g., tdd-UL-DL-ConfigurationCommon) can provide a single slot pattern (e.g., a pattern 1) with a period of P ms, or two different slot patterns (e.g., pattern 1 and pattern 2) with an effective period of P+P2 ms. The applicable values of P and (P+P2) are used to divide 20 ms. Therefore, when a single slot configuration pattern 1 is configured and P=10, the time offset of 5*(2k+1) ms imposes an extra constraint on the slot pattern of the second half-frame (e.g., the slots and/or symbols occupied by the SSB set can be configured as downlink ("D"), although, in theory, the slot and/or symbols might also be configured as uplink ("U") or flexible ("F")). When two different slot patterns are configured and P=P2=5, the time offset of 5*(2k+1) ms imposes an extra constraint for "U" and "F" on pattern 2. Similarly, when two different slot patterns are configured and P=P2=10, the time offset of 5*(2k+1) or 10*(2k+1) ms imposes extra constraints for "U" and "F" on pattern 1 and/or pattern 2.

In a cell that allows RedCap UEs access, NCD-SSB sets can be transmitted at least in an RRC-configured DL BWP of a RedCap UE. A RedCap UE can support existing applicable mandatory features based on an SSB set using NCD-SSB (including NCD-SSB based measurements) as a mandatory feature in an RRC-configured DL BWP that does not include CD-SSB set. In this case, the NCD-SSB shares the same PCI as the CD-SSB set, the NCD-SSB has the same numerology as the CD-SSB set, and the NCD-SSB is 'QCL'-ed with CD-SSB set when the NCD-SSB and CD-SSB set share the same SSB index. The periodicity of the NCD-SSB is no less than the periodicity of the CD-SSB set, which can be chosen from the range of {5, 10, 20, 40, 80, 160} ms. However, in some cases, NCD-SSB is not supported independent of an associated CD-SSB set outside of a RedCap UE context.

Some aspects of the techniques and apparatuses described herein may provide NCD-SSB configurations for extending the use of NCD-SSB to non-RedCap UEs and/or to contexts in which an accompanying CD-SSB set is not also utilized. For example, in some aspects, to facilitate the scheduling flexibility of the network, a non-zero time offset between NCD-SSB and CD-SSB may be configured. In some aspects, other NCD-SSB parameters may be configured to facilitate NCD-SSB use by RedCap and Non-RedCap UEs. In some aspects, for example, a UE may receive an NCD-SSB configuration indicating one or more parameters corresponding to transmission, via at least one NCD-SSB burst, of at least one NCD-SSB set associated with at least one cell. The at least one cell may be at least one of a primary cell or a secondary cell. The UE may receive the at least one NCD-SSB burst based at least in part on the NCD-SSB configuration. In this way, for example, NCD-SSB configurations may be extended to allow for reduction of signaling overhead of periodic reference signals for synchronization, automatic gain control, beam management, radio link monitoring, and/or beam failure recovery. The extension of NCD-SSB also may support co-existence of different types of UEs and multiple timing advance groups (TAGs). In some aspects, the extension of NCD-SSB also may facilitate adaptation to different slot pattern configurations for TDD without impacting the UL coverage and/or throughput. As a result, some aspects may positively impact network performance.

As indicated above, FIG. 4 is provided as an example. Other examples may differ from what is described with regard to FIG. 4.

Figure 5:
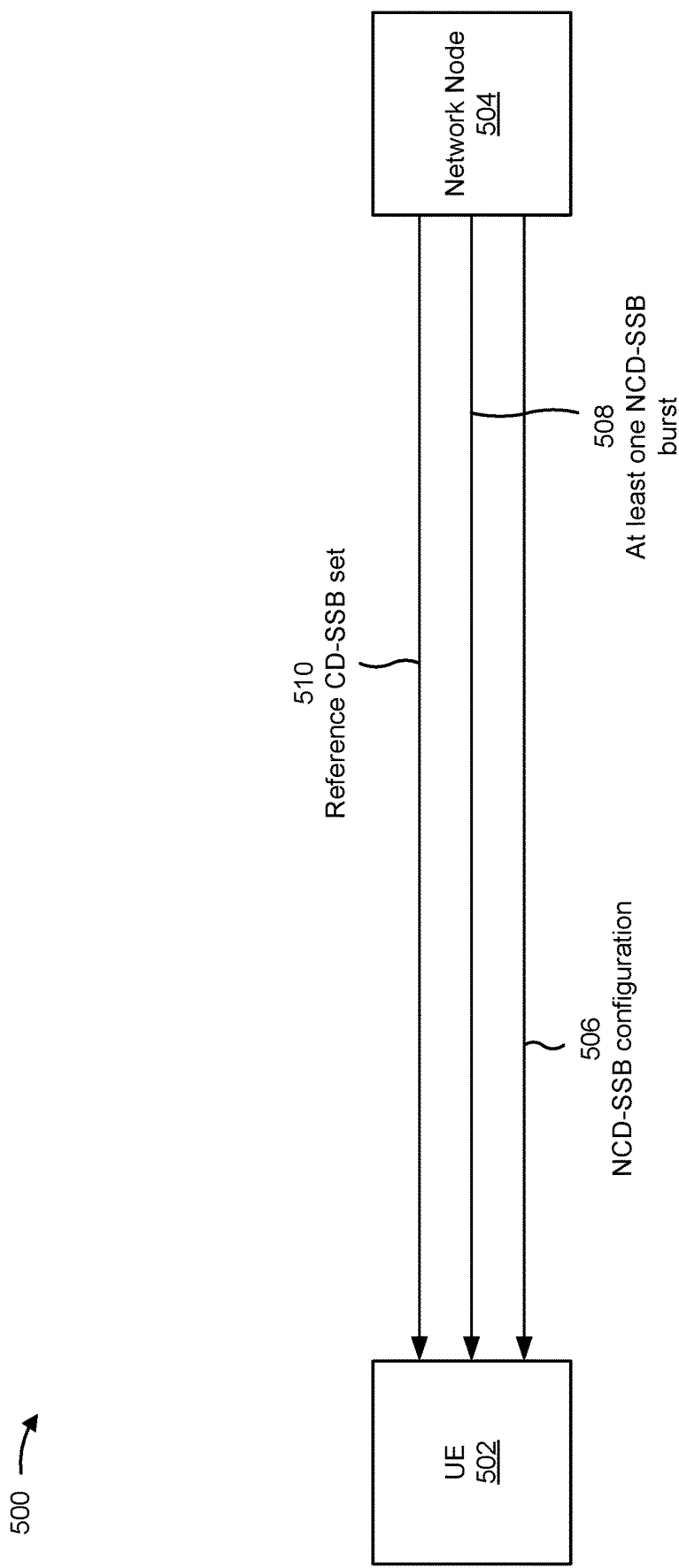
FIG. 5 is a diagram illustrating an example associated with non-cell-defining synchronization signal and physical broadcast channel block (NCD-SSB) configurations, in accordance with the present disclosure.

FIG. 5 is a diagram illustrating an example 500 associated with NCD-SSB configurations, in accordance with the present disclosure. As shown in FIG. 5, a UE 502 and a network node 504 may communicate with one another. The network node 504 may be, include, or be included in one or more TRPs and may support one or more cells, including one or more serving cells and/or one or more secondary cells. In some aspects, the UE 502 may be a RedCap UE and, in some other aspects, the UE 502 may be a non-RedCap UE.

As shown by reference number 506, the network node 504 may transmit, and the UE 502 may receive, an NCD-SSB configuration. The NCD-SSB configuration may indicate one or more parameters corresponding to transmission, via at least one NCD-SSB burst, of at least one NCD-SSB set associated with at least one cell. The at least one cell may include at least one of a primary cell or a secondary cell. In some aspects, the NCD-SSB configuration may be transmitted via at least one of system information (SI), an RRC message, a medium access control (MAC) control element (MAC CE), or downlink control information (DCI). As shown by reference number 508, the network node 504 may transmit, and the UE 502 may receive, the at least one NCD-SSB burst based at least in part on the NCD-SSB configuration.

In some aspects, the at least one NCD-SSB set is not transmitted together with a cell-defining SSB set on the at least one cell or a cell group associated with the at least one cell. In some aspects, the NCD-SSB configuration may correspond to at least one of an NR TDD band, a sub-band full duplex band (SBFD), a sub-band half duplex band (SBHD), or an NR frequency division duplexing (FDD) band. In some aspects, the NCD-SSB configuration may correspond to a dynamic spectrum sharing (DSS) carrier supporting multiple radio access techniques on a frequency band. For example, the NCD-SSB configuration may configure the UE 502 so that, in NR TDD and/or FDD bands and DSS carriers, NCD-SSB bursts may be transmitted on PCell(s), SCell(s), or both PCell(s) and SCell(s) with or without CD-SSB.

In some aspects, the at least one cell may be associated with at least one TAG. The at least one NCD-SSB set may be configured as a timing reference corresponding to a primary TAG of the at least one TAG or a secondary TAG of the at least one TAG. For example, for a cell supporting multiple TAGs, NCD-SSB may be configured as the timing reference of a primary TAG (pTAG) and/or a secondary TAG (sTAG). In some aspects, the NCD-SSB set and the CD-SSB set may be transmitted on a cell that allows different UE types (e.g., RedCap and non-RedCap) to access. For example, the at least one NCD-SSB set may correspond to a downlink BWP. The downlink BWP may include at least one of an active downlink BWP or a default downlink BWP.

In some aspects, the downlink BWP may be configured with a periodic reference signal corresponding to at least one of synchronization, automatic gain control, beam management, radio link monitoring, or beam failure recovery. In some aspects, the periodic reference signal may include at least one of a tracking reference signal (TRS), a phase tracking reference signal (PTRS), or a non-zero-power (NZP) channel state information reference signal (CSI-RS). In some aspects, at least one parameter corresponding to the reference signal may be based at least in part on the NCD-SSB configuration. For example, the at least one parameter may be at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for bandwidth part (BWP) switching associated with an NCD-SSB transmission within the BWP, a time offset for BWP switching associated with the NCD-SSB transmission within the BWP, a discontinuous reception (DRX) configuration associated with the NCD-SSB set, a wake-up signal (WUS) reception associated with the NCD-SSB set, a paging early indicator (PEI) signal reception associated with the NCD-SSB set, a physical dynamic control channel (PDCCH) monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell.

In some aspects, the configurations and/or presence of NCD-SSB may be provided via one or a combination of SI, RRC, MAC CE and DCI. In some aspects, the NCD-SSB configuration indicates an energy per resource element (EPRE) or an EPRE ratio associated with at least one of a PSS or an SSS. The NCD-SSB configuration may indicate at least one NCD-SSB parameter corresponding to the EPRE or EPRE ratio. The at least one NCD-SSB parameter may include is at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for BWP switching associated with an NCD-SSB transmission within the BWP, a time offset for BWP switching associated with the NCD-SSB transmission within the BWP, a DRX configuration associated with the NCD-SSB set, a WUS reception associated with the NCD-SSB set, a PEI signal reception associated with the NCD-SSB set, a PDCCH monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell. For example, an NCD-SSB burst may include at most 64 SSB indexes. However, not all 64 SSB indexes need to be transmitted on a cell. Instead, the network node 504 may signal a bit map to the UE 502 to indicate which SSB indexes are actually transmitted in an NCD-SSB burst.

The at least one NCD-SSB set may include a plurality of SSB indexes, and the UE may receive the at least one NCD-SSB set based on receiving the plurality of SSB indexes within a half-frame of a radio frame. For example, in some aspects, all SSB block indexes of an NCD-SSB burst may be transmitted within a half frame of a radio frame. In some aspects, as shown by reference number 510, the network node 504 may transmit, and the UE 502 may receive, a reference CD-SSB set associated with at least one of the at least one cell or a cell group corresponding to the at least one cell. The at least one cell may be configured with the NCD-SSB set, and the at least one NCD-SSB set may be mapped to a first half-frame of a first radio frame. The CD-SSB set may be mapped to a second half-frame of a second radio frame. In some aspects, the first half-frame may be the second half-frame. For example, when NCD-SSB and the reference CD-SSB set are transmitted on the same cell or cell group, NCD-SSB set and CD-SSB set may be mapped to the same half-frame, or different half-frames of a radio frame. In some aspects, a half-frame may be a 5 ms time period and a radio frame may be a 10 ms time period.

In some aspects, the at least one NCD-SSB may include a plurality of NCD-SSB bursts and the CD-SSB set may include a plurality of CD-SSB bursts having a first CD-SSB burst associated with a reference system frame number (SFN) (e.g., an SFN #0). The NCD-SSB configuration may indicate a time offset between a first symbol of a first NCD-SSB burst transmitted on or after the reference system frame number and a first symbol of the first CD-SSB burst associated with the reference system frame number. In some aspects, the time offset may include a quantity of slots equivalent to a product of a constant time unit and a variable having a value that is equal to a selected integer. The selected integer may include an integer selected from a subset of a specified range of integers including negative values, positive values and zero. For example, the time duration of O slots may be equivalent to 5*k ms, where k is an integer in the range of [−32, 32]. Examples of the constant time unit may include 5 ms, 1 ms, and/or 10 ms, among other examples.

In some aspects, a slot duration corresponding to the constant time unit may be based at least in part on at least one of a reference numerology associated with the CD-SSB set or the at least one NCD-SSB set being transmitted on the at least one cell or a same cell group. In some aspects, the at least one NCD-SSB may correspond to an FDD band, a SBFD, or a sub-band half duplex band, and the subset of the specified range of integers may include the specified range of integers. For example, on an FDD band, k may be any value in the range of [−32, 32]. In some aspects, the at least one NCD-SSB may correspond to a TDD band, and the subset of the specified range of integers may be based at least in part on a TDD slot pattern configuration and a mapping from a plurality of NCD-SSB indexes associated with an NCD-SSB burst of the plurality of NCD-SSB bursts onto one or more downlink time resources corresponding to a TDD slot pattern. On a TDD band, k may be selected to ensure that all NCD-SSB blocks indicated by ssb-PositionsInBurst are mapped to the DL slots/symbols of a TDD slot.

In some aspects, the at least one NCD-SSB may correspond to a dynamic spectrum sharing carrier, and the subset of the specified range of integers may be based at least in part on at least one of a first mapping between a plurality of NCD-SSBs associated with an NCD-SSB burst of the plurality of NCD-SSB bursts and one or more multicast-broadcast single frequency network (MBSFN) subframes or a second mapping between the plurality of NCD-SSBs and one or more downlink symbols that are not associated with a CRS.

In some aspects, the UE 502 may receive system information, and the at least one NCD-SSB may correspond to a TDD band, a sub-band full duplex band (SBFD), or a sub-band half duplex band (SBHD). The subset of the specified range of integers may be based at least in part on one or more pattern configurations. The one or more pattern configurations may include at least one of a TDD slot pattern, an SBFD pattern, or an SBHD pattern. The one or more pattern configurations may be indicated by at least one of the system information, a medium access control layer control element (MAC CE), a dynamic slot format indication, or an RRC message. In some aspects, the one or more pattern configurations may include a single slot pattern configuration indicating a single slot pattern with downlink resources suitable for an SSB burst transmission. The subset of the specified range of integers may be based at least in part on a periodicity pattern of the single slot pattern. In some aspects, the one or more TDD slot pattern configurations may indicate two slot patterns with downlink resources suitable for a SSB burst transmission, and the subset of the specified range of integers may be based at least in part on a sum of a first periodicity pattern of a first slot pattern of the two slot patterns and a second periodicity of a second slot pattern of the two slot patterns.

In some aspects, at least one of the first half-frame or the second half-frame may correspond to a first mapping between a first plurality of SSB indexes associated with the at least one NCD-SSB burst and a first set of downlink resources or a second mapping between a second plurality of SSB indexes associated with the CD-SSB burst and a second set of downlink resources. A time offset may include an integer number of half-frames indicated by at least one of SI, an RRC message, a MAC CE, or DCI.

For example, in a first option, a time duration of O slots may be equivalent to 5*k ms, where k is an integer in the range of [−32, 32]. On a FDD band, k may be any value in the range of [−32, 32]. On a TDD band, the selection of k may be performed to ensure all NCD-SSB blocks indicated by ssb-PositionsInBurst are mapped to the DL slots/symbols of a TDD slot. On a DSS carrier, the selection of k may be performed to ensure all NCD-SSB blocks indicated by ssb-PositionsInBurst are mapped to the MBSFN subframes or the DL symbols without LTE-CRS.

In a second option, on a TDD band, O may depend on the slot pattern configurations provided in SI. For example, if only a single TDD slot pattern (pattern1) is provided by tdd-UL-DL-ConfigurationCommon, the periodicity of pattern1 (P) divides the time offset O. If two different slot patterns are provided by tdd-UL-DL-ConfigurationCommon, the effective periodicity of the two TDD slot patterns $(P+P_2)$ divides the time offset O. In a third option, within the half-frame containing an NCD-SSB burst or a CD-SSB burst, the SSB block indexes may be mapped to the same or different set of DL slots/symbols, where the time offset O is an integer provided by SI, RRC, MAC CE or DCI.

As indicated above, FIG. 5 is provided as an example. Other examples may differ from what is described with respect to FIG. 5.

Figure 6:
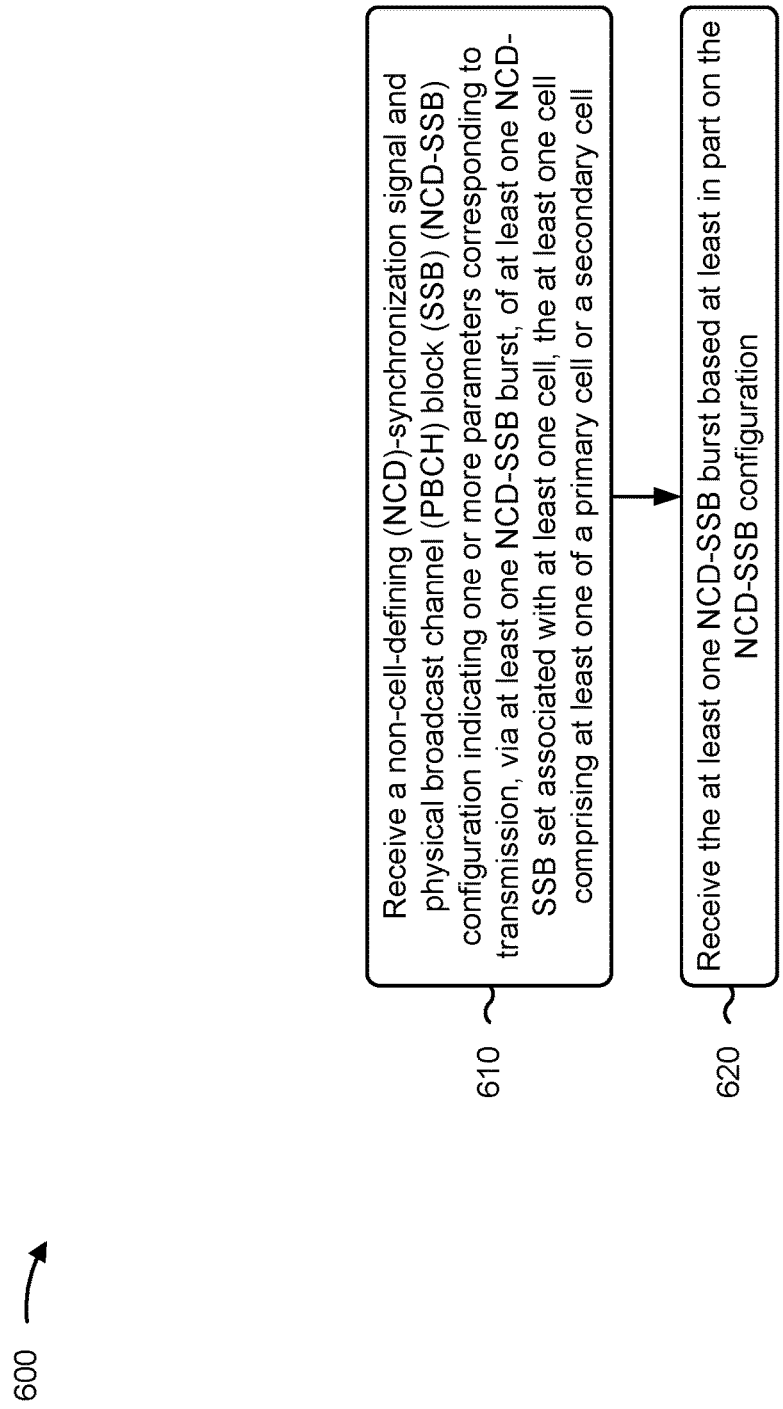
FIGS. 6 and 7 are diagrams illustrating example processes associated with NCD-SSB configurations, in accordance with the present disclosure.

FIG. 6 is a diagram illustrating an example process 600 performed, for example, by a UE, in accordance with the present disclosure. Example process 600 is an example where the UE (e.g., UE 502) performs operations associated with NCD-SSB configurations.

As shown in FIG. 6, in some aspects, process 600 may include receiving an NCD-SSB configuration indicating one or more parameters corresponding to transmission, via at least one NCD-SSB burst, of at least one NCD-SSB set associated with at least one cell, the at least one cell comprising at least one of a primary cell or a secondary cell (block 610). For example, the UE (e.g., using communication manager 808 and/or reception component 802, depicted in FIG. 8) may receive an NCD-SSB configuration indicating one or more parameters corresponding to transmission, via at least one NCD-SSB burst, of at least one NCD-SSB set associated with at least one cell, the at least one cell comprising at least one of a primary cell or a secondary cell, as described above.

As further shown in FIG. 6, in some aspects, process 600 may include receiving the at least one NCD-SSB burst based at least in part on the NCD-SSB configuration (block 620). For example, the UE (e.g., using communication manager 808 and/or reception component 802, depicted in FIG. 8) may receive the at least one NCD-SSB burst based at least in part on the NCD-SSB configuration, as described above.

Process 600 may include additional aspects, such as any single aspect or any combination of aspects described below and/or in connection with one or more other processes described elsewhere herein.

In some aspects, the UE comprises a non-reduced capacity UE. In some aspects, the at least one NCD-SSB set is not transmitted together with a cell-defining SSB set on the at least one cell or a cell group associated with the at least one cell. In some aspects, the NCD-SSB configuration corresponds to at least one of an NR time division duplexing band, a SBFD, a sub-band half duplex band, or an NR frequency division duplexing band. In some aspects, the NCD-SSB configuration corresponds to a DSS carrier supporting multiple radio access techniques on a frequency band. In some aspects, the at least one cell is associated with at least one TAG, and wherein the at least one NCD-SSB is configured as a timing reference corresponding to a primary TAG of the at least one TAG or a secondary TAG of the at least one TAG. In some aspects, the at least one cell is associated with at least one UE type, the at least one UE type comprising at least one of a RedCap UE type or a non-RedCap UE type.

In some aspects, the at least one NCD-SSB set corresponds to a downlink bandwidth part, the downlink bandwidth part comprising at least one of an active downlink bandwidth part or a default downlink bandwidth part. In some aspects, the downlink bandwidth part is configured with a periodic reference signal corresponding to at least one of synchronization, automatic gain control, beam management, radio link monitoring, or beam failure recovery. In some aspects, the periodic reference signal comprises at least one of a TRS, a PTRS, or an NZP CSI-RS. In some aspects, at least one parameter corresponding to the periodic reference signal is based at least in part on the NCD-SSB configuration. In some aspects, the at least one parameter comprises at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for BWP switching associated with an NCD-SSB transmission within the BWP, a time offset for BWP switching associated with the NCD-SSB transmission within the BWP, a DRX configuration associated with the NCD-SSB set, a WUS reception associated with the NCD-SSB set, a PEI signal reception associated with the NCD-SSB set, a PDCCH monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell.

In some aspects, receiving the NCD-SSB configuration comprises receiving at least one of SI, an RRC message, a MAC CE, or DCI. In some aspects, the NCD-SSB configuration indicates an EPRE or an EPRE ratio associated with at least one of a PSS or an SSS. In some aspects, the NCD-SSB configuration indicates at least one NCD-SSB parameter corresponding to the EPRE or EPRE ratio, the at least one NCD-SSB parameter comprising at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, or a frequency range of the cell.

In some aspects, the at least one NCD-SSB set consisting of a plurality of SSB indexes, and process 600 includes receiving the at least one NCD-SSB set comprises receiving the plurality of SSB indexes within a half-frame of a radio frame. In some aspects, process 600 includes receiving a reference CD-SSB set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame. In some aspects, the first half-frame is the second half-frame. In some aspects, the at least one NCD-SSB comprises a plurality of NCD-SSB bursts and the CD-SSB set comprises a plurality of CD-SSB bursts having a first CD-SSB burst associated with a reference system frame number, and wherein the NCD-SSB configuration indicates a time offset between a first symbol of a first NCD-SSB burst transmitted on or after the reference system frame number and a first symbol of the first CD-SSB burst associated with the reference system frame number.

In some aspects, the time offset comprises a quantity of slots equivalent to a product of a constant time unit and a variable having a value that is equal to a selected integer, wherein the selected integer comprises an integer selected from a subset of a specified range of integers including negative values, positive values and zero. In some aspects, a slot duration corresponding to the constant time unit is based at least in part on at least one of a reference numerology associated with the CD-SSB set or the at least one NCD-SSB set being transmitted on the at least one cell or a same cell group. In some aspects, the at least one NCD-SSB corresponds to a frequency division duplexing band, a SBFD, or a sub-band half duplex band, and wherein the subset of the specified range of integers comprises the specified range of integers.

In some aspects, wherein the at least one NCD-SSB corresponds to a TDD band, an SBFD or an SBHD band, and wherein the subset of the specified range of integers is based at least in part on a TDD slot pattern, a SBFD slot pattern or a SBHD slot pattern configuration and a mapping from a plurality of NCD-SSB indexes associated with an NCD-SSB burst of the plurality of NCD-SSB bursts onto one or more downlink time resources corresponding to a TDD slot pattern, a SBFD slot pattern or a SBHD slot pattern. In some aspects, the at least one NCD-SSB corresponds to a dynamic spectrum sharing carrier, and wherein the subset of the specified range of integers is based at least in part on at least one of a first mapping between a plurality of NCD-SSBs associated with an NCD-SSB burst of the plurality of NCD-SSB bursts and one or more MBSFN subframes or a second mapping between the plurality of NCD-SSBs and one or more downlink symbols that are not associated with CRS.

In some aspects, process 600 includes receiving system information, wherein the at least one NCD-SSB corresponds to a TDD band, an SBFD, or an SBHD, and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a MAC CE, a dynamic slot format indication, or an RRC message. In some aspects, the one or more TDD slot pattern configurations consist of a single slot pattern configuration indicating a single slot pattern with downlink resources suitable for an SSB burst transmission, and wherein the subset of the specified range of integers is based at least in part on a periodicity pattern of the single slot pattern. In some aspects, the one or more TDD slot pattern configurations indicate two slot patterns with downlink resources suitable for a SSB burst transmission, and wherein the subset of the specified range of integers is based at least in part on a sum of a first periodicity pattern of a first slot pattern of the two slot patterns and a second periodicity of a second slot pattern of the two slot patterns.

In some aspects, at least one of the first half-frame or the second half-frame corresponds to a first mapping between a first plurality of SSB indexes associated with the at least one NCD-SSB burst and a first set of downlink resources or a second mapping between a second plurality of SSB indexes associated with the CD-SSB burst and a second set of downlink resources, wherein a time offset comprises an integer number of half-frames indicated by at least one of SI, an RRC message, a MAC CE, or DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
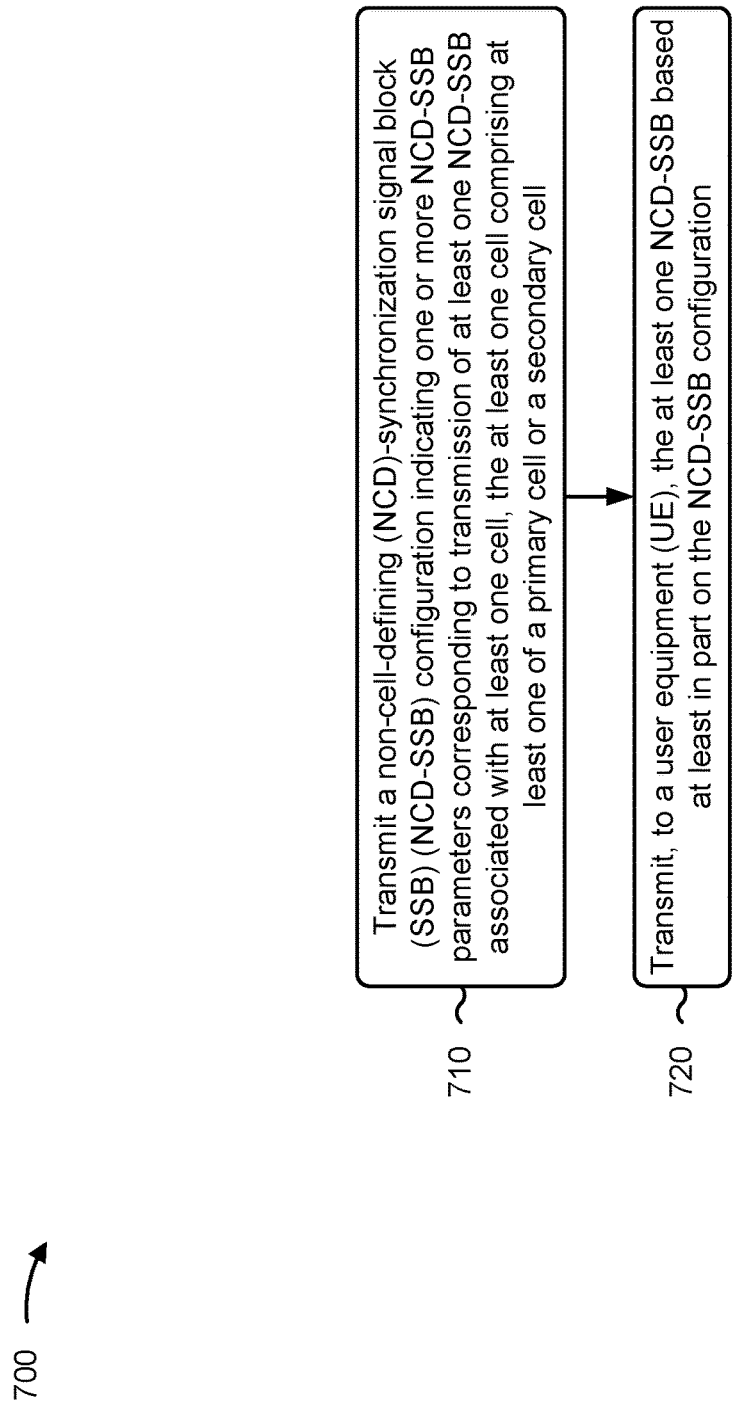

FIG. 7 is a diagram illustrating an example process 700 performed, for example, by a network node, in accordance with the present disclosure. Example process 700 is an example where the network node (e.g., network node 504) performs operations associated with NCD-SSB configurations.

As shown in FIG. 7, in some aspects, process 700 may include transmitting an NCD-SSB configuration indicating one or more NCD-SSB parameters corresponding to transmission of at least one NCD-SSB associated with at least one cell, the at least one cell comprising at least one of a primary cell or a secondary cell (block 710). For example, the network node (e.g., using communication manager 908 and/or transmission component 904, depicted in FIG. 9) may transmit an NCD-SSB configuration indicating one or more NCD-SSB parameters corresponding to transmission of at least one NCD-SSB associated with at least one cell, the at least one cell comprising at least one of a primary cell or a secondary cell, as described above.

As further shown in FIG. 7, in some aspects, process 700 may include transmitting, to a UE, the at least one NCD-SSB based at least in part on the NCD-SSB configuration (block 720). For example, the network node (e.g., using communication manager 908 and/or transmission component 904, depicted in FIG. 9) may transmit, to a UE, the at least one NCD-SSB based at least in part on the NCD-SSB configuration, as described above.

Process 700 may include additional aspects, such as any single aspect or any combination of aspects described below and/or in connection with one or more other processes described elsewhere herein.

In some aspects, the UE comprises a non-reduced capacity UE. In some aspects, the at least one NCD-SSB set is not transmitted together with a cell-defining SSB set on the at least one cell or a cell group associated with the at least one cell. In some aspects, the NCD-SSB configuration corresponds to at least one of an NR TDD band, a SBFD, a sub-band half duplex band, or an NR FDD band. In some aspects, the NCD-SSB configuration corresponds to a DSS carrier supporting multiple radio access techniques on a frequency band. In some aspects, the at least one cell is associated with at least one TAG, and wherein the at least one NCD-SSB is configured as a timing reference corresponding to a primary TAG of the at least one TAG or a secondary TAG of the at least one TAG.

In some aspects, the at least one cell is associated with at least one UE type, the at least one UE type comprising at least one of a RedCap UE type or a non-RedCap UE type. In some aspects, the at least one NCD-SSB set corresponds to a downlink bandwidth part, the downlink bandwidth part comprising at least one of an active downlink bandwidth part or a default downlink bandwidth part. In some aspects, the downlink bandwidth part is configured with a periodic reference signal corresponding to at least one of synchronization, automatic gain control, beam management, radio link monitoring, or beam failure recovery. In some aspects, the periodic reference signal comprises at least one of a TRS, a PTRS, or an NZP CSI-RS. In some aspects, at least one parameter corresponding to the periodic reference signal is based at least in part on the NCD-SSB configuration. In some aspects, the at least one parameter comprises at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for BWP switching associated with an NCD-SSB transmission within the BWP, a time offset for BWP switching associated with the NCD-SSB transmission within the BWP, a DRX configuration associated with the NCD-SSB set, a WUS reception associated with the NCD-SSB set, a PEI signal reception associated with the NCD-SSB set, a PDCCH monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell.

In some aspects, transmitting the NCD-SSB configuration comprises transmitting at least one of SI, an RRC message, a MAC CE, or DCI. In some aspects, the NCD-SSB configuration indicates an EPRE or an EPRE ratio associated with at least one of a PSS or an SSS. In some aspects, the NCD-SSB configuration indicates at least one NCD-SSB parameter corresponding to the EPRE or EPRE ratio, the at least one NCD-SSB parameter comprising at least one of a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, or a frequency range of the In some aspects, the at least one NCD-SSB set consists of a plurality of SSB indexes, and the process 700 includes transmitting the at least one NCD-SSB set comprises transmitting the plurality of SSB indexes within a half-frame of a radio frame. In some aspects, process 700 includes transmitting a reference CD-SSB set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame. In some aspects, the first half-frame is the second half-frame.

In some aspects, the at least one NCD-SSB comprises a plurality of NCD-SSB bursts and the CD-SSB set comprises a plurality of CD-SSB bursts having a first CD-SSB burst associated with a reference system frame number, and wherein the NCD-SSB configuration indicates a time offset between a first symbol of a first NCD-SSB burst transmitted on or after the reference system frame number and a first symbol of the first CD-SSB burst associated with the reference system frame number. In some aspects, the time offset comprises a quantity of slots equivalent to a product of a constant time unit and a variable having a value that is equal to a selected integer, wherein the selected integer comprises an integer selected from a subset of a specified range of integers including negative values, positive values and zero.

In some aspects, a slot duration corresponding to the constant time unit is based at least in part on at least one of a reference numerology associated with the CD-SSB set or the at least one NCD-SSB set being transmitted on the at least one cell or a same cell group. In some aspects, the at least one NCD-SSB corresponds to a frequency division duplexing band, a SBFD, or a sub-band half duplex band, and wherein the subset of the specified range of integers comprises the specified range of integers. In some aspects, the at least one NCD-SSB corresponds to a TDD band, an SBFD, or an SBHD, and wherein the subset of the specified range of integers is based at least in part on a TDD slot pattern, a SBFD slot pattern, or a SBHD slot pattern configuration and a mapping from a plurality of NCD-SSB indexes associated with an NCD-SSB burst of the plurality of NCD-SSB bursts onto one or more downlink time resources corresponding to a TDD slot pattern, a SBFD slot pattern, or a SBHD slot pattern. In some aspects, the at least one NCD-SSB corresponds to a dynamic spectrum sharing carrier, and wherein the subset of the specified range of integers is based at least in part on at least one of a first mapping between a plurality of NCD-SSBs associated with an NCD-SSB burst of the plurality of NCD-SSB bursts and one or more MBSFN subframes or a second mapping between the plurality of NCD-SSBs and one or more downlink symbols that are not associated with CRS.

In some aspects, process 700 includes transmitting system information, wherein the at least one NCD-SSB corresponds to a time division duplexing (TDD) band, an SBFD, or an SBHD, and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a MAC CE, a dynamic slot format indication, or an RRC message. In some aspects, the one or more TDD slot pattern configurations consist of a single slot pattern configuration indicating a single slot pattern with downlink resources suitable for an SSB burst transmission, and wherein the subset of the specified range of integers is based at least in part on a periodicity pattern of the single slot pattern. In some aspects, the one or more TDD slot pattern configurations indicate two slot patterns with downlink resources suitable for a SSB burst transmission, and wherein the subset of the specified range of integers is based at least in part on a sum of a first periodicity pattern of a first slot pattern of the two slot patterns and a second periodicity of a second slot pattern of the two slot patterns.

In some aspects, at least one of the first half-frame or the second half-frame corresponds to a first mapping between a first plurality of SSB indexes associated with the at least one NCD-SSB burst and a first set of downlink resources or a second mapping between a second plurality of SSB indexes associated with the CD-SSB burst and a second set of downlink resources, wherein a time offset comprises an integer number of half-frames indicated by at least one of SI, a an RRC message, a MAC CE, or DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
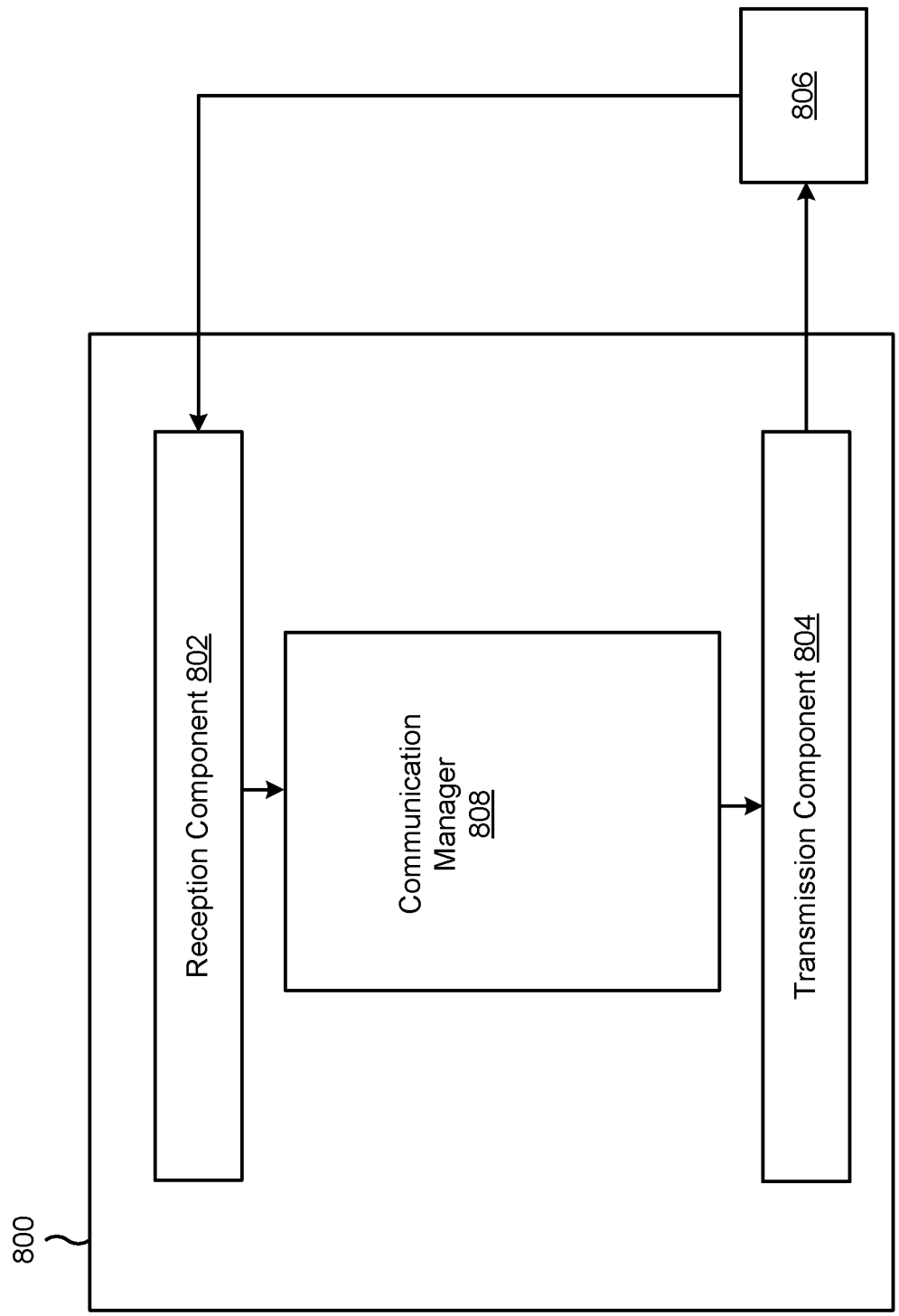
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 5-7. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 808 and/or the reception component 802 may receive an NCD-SSB configuration indicating one or more parameters corresponding to transmission, via at least one NCD-SSB burst, of at least one NCD-SSB set associated with at least one cell, the at least one cell comprising at least one of a primary cell or a secondary cell. The communication manager 808 and/or the reception component 802 may receive the at least one NCD-SSB burst based at least in part on the NCD-SSB configuration.

In some aspects, the communication manager 808 may include one or more antennas, a modem, a controller/processor, a memory, or a combination thereof, of the UE described in connection with FIG. 2. In some aspects, the communication manager 808 may include the reception component 802 and/or the transmission component 804. In some aspects, the communication manager 808 may be, be similar to, include, or be included in, the communication manager 140 depicted in FIGS. 1 and 2.

The communication manager 808 and/or the reception component 802 may receive a reference CD-SSB set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame. The communication manager 808 and/or the reception component 802 may receive system information, wherein the at least one NCD-SSB corresponds to a TDD band, an SBFD, or an SBHD, and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a medium access control layer control element (MAC CE), a dynamic slot format indication, or a radio resource control (RRC) message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
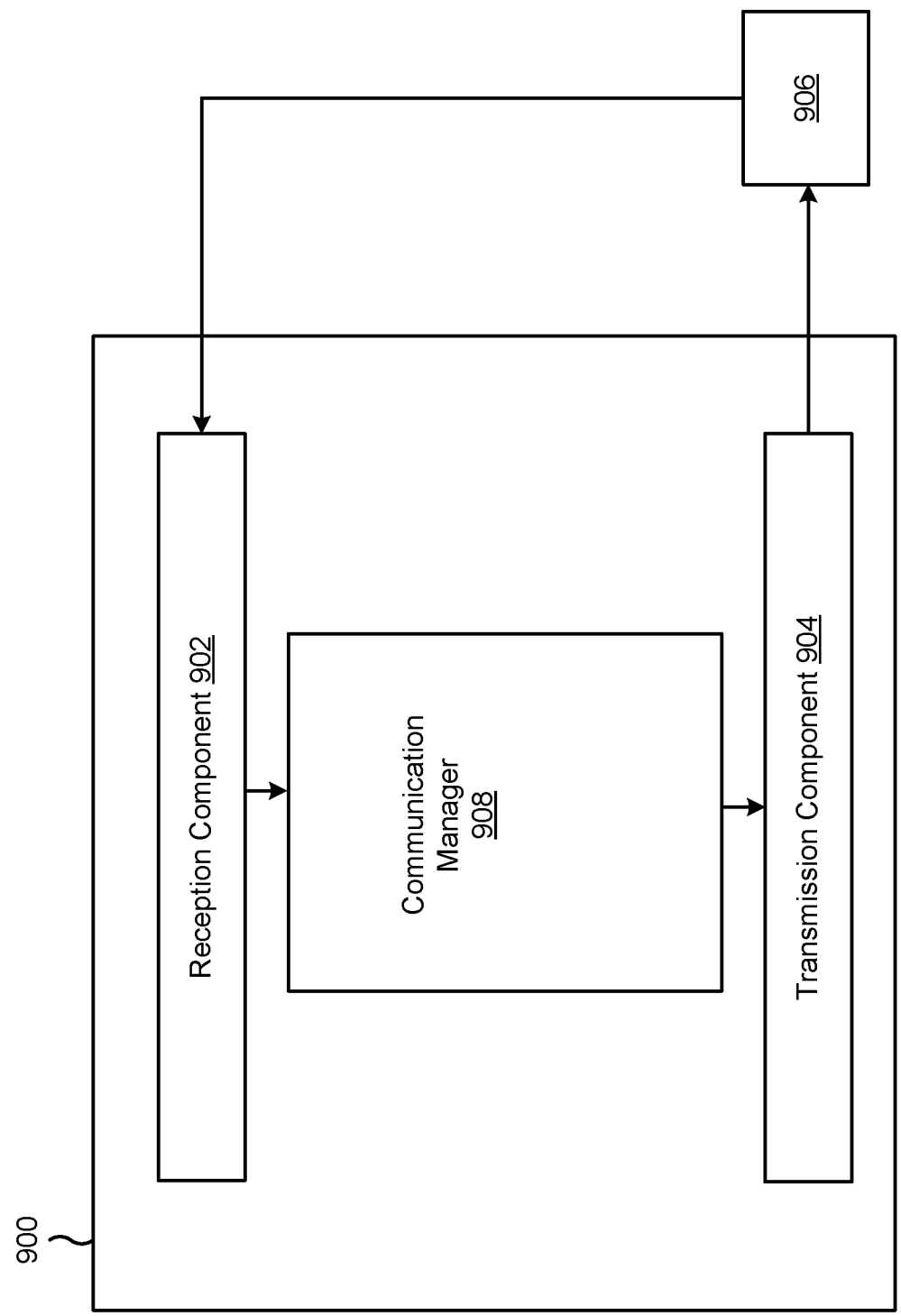

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit an NCD-SSB configuration indicating one or more NCD-SSB parameters corresponding to transmission of at least one NCD-SSB associated with at least one cell, the at least one cell comprising at least one of a primary cell or a secondary cell. The transmission component 904 may transmit, to a UE, the at least one NCD-SSB based at least in part on the NCD-SSB configuration.

In some aspects, the communication manager 908 may include one or more antennas, a modem, a controller/processor, a memory, or a combination thereof, of the network node described in connection with FIG. 2. In some aspects, the communication manager 908 may include the reception component 902 and/or the transmission component 904. In some aspects, the communication manager 908 may be, be similar to, include, or be included in, the communication manager 150 depicted in FIGS. 1 and 2.

The transmission component 904 may transmit a reference CD-SSB set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame. The transmission component 904 may transmit system information, wherein the at least one NCD-SSB corresponds to a TDD band, an SBFD, or an SBHD, and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a MAC CE, a dynamic slot format indication, or an RRC message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell; and receiving the at least one NCD-SSB burst based at least in part on the NCD-SSB configuration.

Aspect 2: The method of Aspect 1, wherein the UE comprises a non-reduced capacity UE.

Aspect 3: The method of either of Aspects 1 or 2, wherein the at least one NCD-SSB set is not transmitted together with a cell-defining SSB set on the at least one cell or a cell group associated with the at least one cell.

Aspect 4: The method of any of Aspects 1-3, wherein the NCD-SSB configuration corresponds to at least one of a New Radio (NR) time division duplexing band, a sub-band full duplex band, a sub-band half duplex band, or an NR frequency division duplexing band.

Aspect 5: The method of any of Aspects 1-4, wherein the NCD-SSB configuration corresponds to a dynamic spectrum sharing (DSS) carrier supporting multiple radio access techniques on a frequency band.

Aspect 6: The method of any of Aspects 1-5, wherein the at least one cell is associated with at least one timing advance group (TAG), and wherein the at least one NCD-SSB is configured as a timing reference corresponding to a primary TAG of the at least one TAG or a secondary TAG of the at least one TAG.

Aspect 7: The method of any of Aspects 1-6, wherein the at least one cell is associated with at least one UE type, the at least one UE type comprising at least one of a reduced capability (RedCap) UE type or a non-RedCap UE type.

Aspect 8: The method of any of Aspects 1-7, wherein the at least one NCD-SSB set corresponds to a downlink bandwidth part, the downlink bandwidth part comprising at least one of an active downlink bandwidth part or a default downlink bandwidth part.

Aspect 9: The method of Aspect 8, wherein the downlink bandwidth part is configured with a periodic reference signal corresponding to at least one of synchronization, automatic gain control, beam management, radio link monitoring, or beam failure recovery.

Aspect 10: The method of Aspect 9, wherein the periodic reference signal comprises at least one of a tracking reference signal, a phase tracking reference signal, or a non-zero-power channel state information reference signal.

Aspect 11: The method of either of Aspects 9 or 10, wherein at least one parameter corresponding to the periodic reference signal is based at least in part on the NCD-SSB configuration.

Aspect 12: The method of Aspect 11, wherein the at least one parameter comprises at least one of a periodicity, a density of radio resource mapping, a time offset, a measurement window configuration, a prioritization procedure, a set of filtering parameters, or a power control offset.

Aspect 13: The method of any of Aspects 1-12, wherein receiving the NCD-SSB configuration comprises receiving at least one of system information, a radio resource control message, a medium access control (MAC) control element (MAC CE), or downlink control information.

Aspect 14: The method of any of Aspects 1-13, wherein the NCD-SSB configuration indicates an energy per resource element (EPRE) or an EPRE ratio associated with at least one of a primary synchronization signal (PSS) or a secondary synchronization signal (SSS).

Aspect 15: The method of Aspect 14, wherein the NCD-SSB configuration indicates at least one NCD-SSB parameter corresponding to the EPRE or EPRE ratio, the at least one NCD-SSB parameter comprising at least one of: a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for bandwidth part (BWP) switching associated with an NCD-SSB transmission within the BWP, a time offset for BWP switching associated with the NCD-SSB transmission within the BWP, a discontinuous reception (DRX) configuration associated with the NCD-SSB set, a wake-up signal (WUS) reception associated with the NCD-SSB set, a paging early indicator (PEI) signal reception associated with the NCD-SSB set, a physical downlink control channel (PDCCH) monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell.

Aspect 16: The method of any of Aspects 1-15, the at least one NCD-SSB set consisting of a plurality of SSB indexes, wherein receiving the at least one NCD-SSB set comprises receiving the plurality of SSB indexes within a half-frame of a radio frame.

Aspect 17: The method of any of Aspects 1-16, further comprising receiving a reference cell-defining (CD) SSB (CD-SSB) set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame.

Aspect 18: The method of Aspect 17, wherein the first half-frame is the second half-frame.

Aspect 19: The method of either of Aspects 17 or 18, wherein the at least one NCD-SSB comprises a plurality of NCD-SSB bursts and the CD-SSB set comprises a plurality of CD-SSB bursts having a first CD-SSB burst associated with a reference system frame number, and wherein the NCD-SSB configuration indicates a time offset between a first symbol of a first NCD-SSB burst transmitted on or after the reference system frame number and a first symbol of the first CD-SSB burst associated with the reference system frame number.

Aspect 20: The method of Aspect 19, wherein the time offset comprises a quantity of slots equivalent to a product of a constant time unit and a variable having a value that is equal to a selected integer, wherein the selected integer comprises an integer selected from a subset of a specified range of integers including negative values, positive values and zero.

Aspect 21: The method of Aspect 20, wherein a slot duration corresponding to the constant time unit is based at least in part on at least one of a reference numerology associated with the CD-SSB set or the at least one NCD-SSB set being transmitted on the at least one cell or a same cell group.

Aspect 22: The method of either of Aspects 20 or 21, wherein the at least one NCD-SSB corresponds to a frequency division duplexing band, a sub-band full duplex band, or a sub-band half duplex band, and wherein the subset of the specified range of integers comprises the specified range of integers.

Aspect 23: The method of any of Aspects 20-22, wherein the at least one NCD-SSB corresponds to a time division duplexing (TDD) band, a sub-band full duplex band (SBFD) or a sub-band half duplex band (SBHD), and wherein the subset of the specified range of integers is based at least in part on a TDD slot pattern, a SBFD slot pattern or a SBHD slot pattern configuration and a mapping from a plurality of NCD-SSB indexes associated with an NCD-SSB burst of the plurality of NCD-SSB bursts onto one or more downlink time resources corresponding to a TDD slot pattern, a SBFD slot pattern or a SBHD slot pattern.

Aspect 24: The method of any of Aspects 20-22, wherein the at least one NCD-SSB corresponds to a dynamic spectrum sharing carrier, and wherein the subset of the specified range of integers is based at least in part on at least one of a first mapping between a plurality of NCD-SSBs associated with an NCD-SSB burst of the plurality of NCD-SSB bursts and one or more multicast-broadcast single frequency network (MBSFN) subframes or a second mapping between the plurality of NCD-SSBs and one or more downlink symbols that are not associated with cell-specific reference signal (CRS).

Aspect 25: The method of any of Aspects 20-22, further comprising receiving system information, wherein the at least one NCD-SSB corresponds to a time division duplexing (TDD) band, a sub-band full duplex band (SBFD), or a sub-band half duplex band (SBHD), and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a medium access control layer control element (MAC CE), a dynamic slot format indication, or a radio resource control (RRC) message.

Aspect 26: The method of Aspect 25, wherein the one or more TDD slot pattern configurations consist of a single slot pattern configuration indicating a single slot pattern with downlink resources suitable for an SSB burst transmission, and wherein the subset of the specified range of integers is based at least in part on a periodicity pattern of the single slot pattern.

Aspect 27: The method of Aspect 25, wherein the one or more TDD slot pattern configurations indicate two slot patterns with downlink resources suitable for a SSB burst transmission, and wherein the subset of the specified range of integers is based at least in part on a sum of a first periodicity pattern of a first slot pattern of the two slot patterns and a second periodicity of a second slot pattern of the two slot patterns.

Aspect 28: The method of any of Aspects 17-27, wherein at least one of the first half-frame or the second half-frame corresponds to a first mapping between a first plurality of SSB indexes associated with the at least one NCD-SSB burst and a first set of downlink resources or a second mapping between a second plurality of SSB indexes associated with the CD-SSB burst and a second set of downlink resources, wherein a time offset comprises an integer number of half-frames indicated by at least one of system information, a radio resource control message, a medium access control (MAC) control element (MAC CE), or downlink control information.

Aspect 29: A method of wireless communication performed by a network node, comprising: transmitting a non-cell-defining (NCD)-synchronization signal block (SSB) (NCD-SSB) configuration indicating one or more NCD-SSB parameters corresponding to transmission of at least one NCD-SSB associated with at least one cell, the at least one cell comprising at least one of a primary cell or a secondary cell; and transmitting, to a user equipment (UE), the at least one NCD-SSB based at least in part on the NCD-SSB configuration.

Aspect 30: The method of Aspect 29, wherein the UE comprises a non-reduced capacity UE.

Aspect 31: The method of either of Aspects 29 or 30, wherein the at least one NCD-SSB set is not transmitted together with a cell-defining SSB set on the at least one cell or a cell group associated with the at least one cell.

Aspect 32: The method of any of Aspects 29-31, wherein the NCD-SSB configuration corresponds to at least one of a New Radio (NR) time division duplexing band, a sub-band full duplex band, a sub-band half duplex band, or an NR frequency division duplexing band.

Aspect 33: The method of any of Aspects 29-32, wherein the NCD-SSB configuration corresponds to a dynamic spectrum sharing (DSS) carrier supporting multiple radio access techniques on a frequency band.

Aspect 35: The method of any of Aspects 29-34, wherein the at least one cell is associated with at least one UE type, the at least one UE type comprising at least one of a reduced capability (RedCap) UE type or a non-RedCap UE type.

Aspect 36: The method of any of Aspects 29-35, wherein the at least one NCD-SSB set corresponds to a downlink bandwidth part, the downlink bandwidth part comprising at least one of an active downlink bandwidth part or a default downlink bandwidth part.

Aspect 37: The method of any of Aspects 29-36, wherein the downlink bandwidth part is configured with a periodic reference signal corresponding to at least one of synchronization, automatic gain control, beam management, radio link monitoring, or beam failure recovery.

Aspect 38: The method of Aspect 37, wherein the periodic reference signal comprises at least one of a tracking reference signal, a phase tracking reference signal, or a non-zero-power channel state information reference signal.

Aspect 39: The method of either of Aspects 37 or 38, wherein at least one parameter corresponding to the periodic reference signal is based at least in part on the NCD-SSB configuration.

Aspect 40: The method of Aspect 39, wherein the at least one parameter comprises at least one of a periodicity, a density of radio resource mapping, a time offset, a measurement window configuration, a prioritization procedure, a set of filtering parameters, or a power control offset.

Aspect 41: The method of any of Aspects 29-40, wherein transmitting the NCD-SSB configuration comprises transmitting at least one of system information, a radio resource control message, a medium access control (MAC) control element (MAC CE), or downlink control information.

Aspect 42: The method of any of Aspects 29-41, wherein the NCD-SSB configuration indicates an energy per resource element (EPRE) or an EPRE ratio associated with at least one of a primary synchronization signal (PSS) or a secondary synchronization signal (SSS).

Aspect 43: The method of Aspect 42, wherein the NCD-SSB configuration indicates at least one NCD-SSB parameter corresponding to the EPRE or EPRE ratio, the at least one NCD-SSB parameter comprising at least one of: a periodicity of the NCD-SSB set, a subcarrier spacing associated with the NCD-SSB set, a bit map of transmitted NCD-SSB indexes per NCD-SSB burst, a time offset between a cell-defining SSB and the NCD-SSB set, a timer for bandwidth part (BWP) switching associated with an NCD-SSB transmission within the BWP, a time offset for BWP switching associated with the NCD-SSB transmission within the BWP, a discontinuous reception (DRX) configuration associated with the NCD-SSB set, a wake-up signal (WUS) reception associated with the NCD-SSB set, a paging early indicator (PEI) signal reception associated with the NCD-SSB set, a physical downlink control channel (PDCCH) monitoring reduction associated with the NCD-SSB set, a PDCCH skipping configuration associated with the NCD-SSB set, a collision handling procedure between uplink transmission and a reception of the NCD-SSB set, a timing advance validation procedure associated with the NCD-SSB set, a power control procedure associated with the NCD-SSB set, a timing control procedure associated with the NCD-SSB set, a validation procedure for uplink channels and reference signals associated with the NCD-SSB set, a measurement object configuration for the NCD-SSB set, or a frequency range of the cell.

Aspect 44: The method of any of Aspects 29-43, the at least one NCD-SSB set consisting of a plurality of SSB indexes, wherein transmitting the at least one NCD-SSB set comprises transmitting the plurality of SSB indexes within a half-frame of a radio frame.

Aspect 45: The method of any of Aspects 29-44, further comprising transmitting a reference cell-defining (CD) SSB (CD-SSB) set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame.

Aspect 46: The method of Aspect 45, wherein the first half-frame is the second half-frame.

Aspect 47: The method of either of Aspects 45 or 46, wherein the at least one NCD-SSB comprises a plurality of NCD-SSB bursts and the CD-SSB set comprises a plurality of CD-SSB bursts having a first CD-SSB burst associated with a reference system frame number, and wherein the NCD-SSB configuration indicates a time offset between a first symbol of a first NCD-SSB burst transmitted on or after the reference system frame number and a first symbol of the first CD-SSB burst associated with the reference system frame number.

Aspect 48: The method of Aspect 47, wherein the time offset comprises a quantity of slots equivalent to a product of a constant time unit and a variable having a value that is equal to a selected integer, wherein the selected integer comprises an integer selected from a subset of a specified range of integers including negative values, positive values and zero.

Aspect 49: The method of holy Aspect 48, wherein a slot duration corresponding to the constant time unit is based at least in part on at least one of a reference numerology associated with the CD-SSB set or the at least one NCD-SSB set being transmitted on the at least one cell or a same cell group.

Aspect 50: The method of either of Aspects 48 or 49, wherein the at least one NCD-SSB corresponds to a frequency division duplexing band, a sub-band full duplex band, or a sub-band half duplex band, and wherein the subset of the specified range of integers comprises the specified range of integers.

Aspect 51: The method of any of Aspects 48-50, wherein the at least one NCD-SSB corresponds to a time division duplexing (TDD) band, a sub-band full duplex band (SBFD) or a sub-band half duplex band (SBHD), and wherein the subset of the specified range of integers is based at least in part on a TDD slot pattern, a SBFD slot pattern or a SBHD slot pattern configuration and a mapping from a plurality of NCD-SSB indexes associated with an NCD-SSB burst of the plurality of NCD-SSB bursts onto one or more downlink time resources corresponding to a TDD slot pattern, a SBFD slot pattern or a SBHD slot pattern.

Aspect 52: The method of any of Aspects 48-50, wherein the at least one NCD-SSB corresponds to a dynamic spectrum sharing carrier, and wherein the subset of the specified range of integers is based at least in part on at least one of a first mapping between a plurality of NCD-SSBs associated with an NCD-SSB burst of the plurality of NCD-SSB bursts and one or more multicast-broadcast single frequency network (MBSFN) subframes or a second mapping between the plurality of NCD-SSBs and one or more downlink symbols that are not associated with cell-specific reference signal (CRS).

Aspect 53: The method of any of Aspects 48-50, further comprising transmitting system information, wherein the at least one NCD-SSB corresponds to a time division duplexing (TDD) band, a sub-band full duplex band (SBFD), or a sub-band half duplex band (SBHD), and wherein the subset of the specified range of integers is based at least in part on one or more pattern configurations comprising at least one of a TDD slot pattern, an SBFD pattern, or an SBHD pattern, wherein the one or more pattern configurations are indicated by at least one of the system information, a medium access control layer control element (MAC CE), a dynamic slot format indication, or a radio resource control (RRC) message.

Aspect 54: The method of Aspect 53, wherein the one or more TDD slot pattern configurations consist of a single slot pattern configuration indicating a single slot pattern with downlink resources suitable for an SSB burst transmission, and wherein the subset of the specified range of integers is based at least in part on a periodicity pattern of the single slot pattern.

Aspect 55: The method of either of Aspects 53 or 54, wherein the one or more TDD slot pattern configurations indicate two slot patterns with downlink resources suitable for a SSB burst transmission, and wherein the subset of the specified range of integers is based at least in part on a sum of a first periodicity pattern of a first slot pattern of the two slot patterns and a second periodicity of a second slot pattern of the two slot patterns.

Aspect 56: The method of Aspect 45, wherein at least one of the first half-frame or the second half-frame corresponds to a first mapping between a first plurality of SSB indexes associated with the at least one NCD-SSB burst and a first set of downlink resources or a second mapping between a second plurality of SSB indexes associated with the CD-SSB burst and a second set of downlink resources, wherein a time offset comprises an integer number of half-frames indicated by at least one of system information, a radio resource control message, a medium access control (MAC) control element (MAC CE), or downlink control information.

Aspect 57: An apparatus for wireless communication at a device, comprising a processor; memory coupled with the processor; and instructions stored in the memory and executable by the processor to cause the apparatus to perform the method of one or more of Aspects 1-28.

Aspect 58: A device for wireless communication, comprising a memory and one or more processors coupled to the memory, the one or more processors configured to perform the method of one or more of Aspects 1-28.

Aspect 59: An apparatus for wireless communication, comprising at least one means for performing the method of one or more of Aspects 1-28.

Aspect 60: A non-transitory computer-readable medium storing code for wireless communication, the code comprising instructions executable by a processor to perform the method of one or more of Aspects 1-28.

Aspect 61: A non-transitory computer-readable medium storing a set of instructions for wireless communication, the set of instructions comprising one or more instructions that, when executed by one or more processors of a device, cause the device to perform the method of one or more of Aspects 1-28.

Aspect 62: An apparatus for wireless communication at a device, comprising a processor; memory coupled with the processor; and instructions stored in the memory and executable by the processor to cause the apparatus to perform the method of one or more of Aspects 29-56.

Aspect 63: A device for wireless communication, comprising a memory and one or more processors coupled to the memory, the one or more processors configured to perform the method of one or more of Aspects 29-56.

Aspect 64: An apparatus for wireless communication, comprising at least one means for performing the method of one or more of Aspects 29-56.

Aspect 65: A non-transitory computer-readable medium storing code for wireless communication, the code comprising instructions executable by a processor to perform the method of one or more of Aspects 29-56.

Aspect 66: A non-transitory computer-readable medium storing a set of instructions for wireless communication, the set of instructions comprising one or more instructions that, when executed by one or more processors of a device, cause the device to perform the method of one or more of Aspects 29-56.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled with the memory and configured to cause the UE to:
receive a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell; and
receive the at least one NCD-SSB burst based at least in part on the NCD-SSB configuration.

2. The UE of claim 1, wherein the at least one NCD-SSB set is not transmitted together with a cell-defining SSB set on the at least one cell or a cell group associated with the at least one cell.

3. The UE of claim 1, wherein the NCD-SSB configuration corresponds to at least one of a New Radio (NR) time division duplexing band, a sub-band full duplex band, a sub-band half duplex band, or an NR frequency division duplexing band.

4. The UE of claim 1, wherein the NCD-SSB configuration corresponds to a dynamic spectrum sharing (DSS) carrier supporting multiple radio access techniques on a frequency band.

5. The UE of claim 1, wherein the at least one cell is associated with at least one timing advance group (TAG), and wherein the at least one NCD-SSB is configured as a timing reference corresponding to a primary TAG of the at least one TAG or a secondary TAG of the at least one TAG.

6. The UE of claim 1, wherein the at least one cell is associated with at least one UE type, the at least one UE type comprising at least one of a reduced capability (RedCap) UE type or a non-RedCap UE type.

7. The UE of claim 1, wherein the at least one NCD-SSB set corresponds to a downlink bandwidth part, the downlink bandwidth part comprising at least one of an active downlink bandwidth part or a default downlink bandwidth part.

8. The UE of claim 7, wherein the downlink bandwidth part is configured with a periodic reference signal corresponding to at least one of synchronization, automatic gain control, beam management, radio link monitoring, or beam failure recovery.

9. The UE of claim 8, wherein at least one parameter corresponding to the periodic reference signal is based at least in part on the NCD-SSB configuration.

10. The UE of claim 9, wherein the at least one parameter comprises at least one of a periodicity, a density of radio resource mapping, a time offset, a measurement window configuration, a prioritization procedure, a set of filtering parameters, or a power control offset.

11. The UE of claim 1, wherein the one or more processors, to receive the NCD-SSB configuration, are configured to receive at least one of system information, a radio resource control message, a medium access control (MAC) control element (MAC CE), or downlink control information.

12. The UE of claim 1, wherein the NCD-SSB configuration indicates an energy per resource element (EPRE) or an EPRE ratio associated with at least one of a primary synchronization signal (PSS) or a secondary synchronization signal (SSS).

13. The UE of claim 12, wherein the NCD-SSB configuration indicates at least one NCD-SSB parameter corresponding to the EPRE or EPRE ratio, the at least one NCD-SSB parameter comprising at least one of:
a periodicity of the NCD-SSB set,
a subcarrier spacing associated with the NCD-SSB set,
a bit map of transmitted NCD-SSB indexes per NCD-SSB burst,
a time offset between a cell-defining SSB and the NCD-SSB set,
a timer for bandwidth part (BWP) switching associated with an NCD-SSB transmission within the BWP,
a discontinuous reception (DRX) configuration associated with the NCD-SSB set,
a wake-up signal (WUS) reception associated with the NCD-SSB set,
a paging early indicator (PEI) signal reception associated with the NCD-SSB set,
a PDCCH skipping configuration associated with the NCD-SSB set,
a validation procedure for uplink channels and reference signals associated with the NCD-SSB set, of
a measurement object configuration for the NCD-SSB set.

14. The UE of claim 1, the at least one NCD-SSB set consisting of a plurality of SSB indexes, wherein receiving the at least one NCD-SSB set comprises receiving the plurality of SSB indexes within a half-frame of a radio frame.

15. The UE of claim 1, wherein the one or more processors are further configured to receive a reference cell-defining (CD) SSB (CD-SSB) set associated with at least one of the at least one cell or a cell group corresponding to the at least one cell, wherein the at least one cell is configured with the NCD-SSB set, wherein the at least one NCD-SSB set is mapped to a first half-frame of a first radio frame, and wherein the CD-SSB set is mapped to a second half-frame of a second radio frame.

16. The UE of claim 15, wherein the first half-frame is the second half-frame.

17. The UE of claim 15, wherein the at least one NCD-SSB set comprises a plurality of NCD-SSB bursts and the CD-SSB set comprises a plurality of CD-SSB bursts having a first CD-SSB burst associated with a reference system frame number, and wherein the NCD-SSB configuration indicates a time offset between a first symbol of a first NCD-SSB burst transmitted on or after the reference system frame number and a first symbol of the first CD-SSB burst associated with the reference system frame number, wherein the time offset comprises a quantity of slots equivalent to a product of a constant time unit and a variable having a value that is equal to a selected integer, and wherein the selected integer comprises an integer selected from a subset of a specified range of integers including negative values, positive values and zero.

18. The UE of claim 17, wherein a slot duration corresponding to the constant time unit is based at least in part on at least one of a reference numerology associated with the CD-SSB set or the at least one NCD-SSB set being transmitted on the at least one cell or a same cell group.

19. A network node for wireless communication, comprising:
a memory; and
one or more processors coupled with the memory and configured to cause the network node to:
transmit a non-cell-defining (NCD)-synchronization signal block (SSB) (NCD-SSB) configuration indicating one or more NCD-SSB parameters corresponding to transmission of at least one NCD-SSB associated with at least one cell, the at least one cell comprising at least one of a primary cell or a secondary cell; and
transmit, to a user equipment (UE), the at least one NCD-SSB based at least in part on the NCD-SSB configuration.

20. The network node of claim 19, wherein the at least one NCD-SSB set is not transmitted together with a cell-defining SSB set on the at least one cell or a cell group associated with the at least one cell.

21. The network node of claim 19, wherein the NCD-SSB configuration corresponds to at least one of a New Radio (NR) time division duplexing band, a sub-band full duplex band, a sub-band half duplex band, or an NR frequency division duplexing band.

22. The network node of claim 19, wherein the NCD-SSB configuration corresponds to a dynamic spectrum sharing (DSS) carrier supporting multiple radio access techniques on a frequency band.

23. The network node of claim 19, wherein the at least one cell is associated with at least one timing advance group (TAG), and wherein the at least one NCD-SSB is configured as a timing reference corresponding to a primary TAG of the at least one TAG or a secondary TAG of the at least one TAG.

24. The network node of claim 19, wherein the at least one cell is associated with at least one UE type, the at least one UE type comprising at least one of a reduced capability (RedCap) UE type or a non-RedCap UE type.

25. A method of wireless communication performed by a user equipment (UE), comprising:
receiving a non-cell-defining (NCD)-synchronization signal and physical broadcast channel (PBCH) block (SSB) (NCD-SSB) configuration indicating one or more parameters corresponding to transmission, via at least one NCD-SSB burst, of at least one NCD-SSB set associated with at least one cell, the at least one cell comprising at least one of a primary cell or a secondary cell; and
receiving the at least one NCD-SSB burst based at least in part on the NCD-SSB configuration.

26. A method of wireless communication performed by a network node, comprising:
transmitting a non-cell-defining (NCD)-synchronization signal block (SSB) (NCD-SSB) configuration indicating one or more NCD-SSB parameters corresponding to transmission of at least one NCD-SSB associated with at least one cell, the at least one cell comprising at least one of a primary cell or a secondary cell; and
transmitting, to a user equipment (UE), the at least one NCD-SSB based at least in part on the NCD-SSB configuration.

27. The UE of claim 1, wherein the one or more processors are further configured to cause the UE to receive a reference cell-defining SSB (CD-SSB) set associated with at least one of the at least one cell or a cell group corresponding to the at least one cell, wherein a non-zero time offset between NCD-SSB and CD-SSB is configured.

28. The network node of claim 19, wherein the one or more processors are further configured to cause the network node to transmit a reference cell-defining SSB (CD-SSB) set associated with at least one of the at least one cell or a cell group corresponding to the at least one cell, wherein a non-zero time offset between NCD-SSB and CD-SSB is configured.

29. The method of claim 25, further comprising receiving a reference cell-defining SSB (CD-SSB) set associated with at least one of the at least one cell or a cell group corresponding to the at least one cell, wherein a non-zero time offset between NCD-SSB and CD-SSB is configured.

30. The method of claim 26, further comprising transmitting a reference cell-defining SSB (CD-SSB) set associated with at least one of the at least one cell or a cell group corresponding to the at least one cell, wherein a non-zero time offset between NCD-SSB and CD-SSB is configured.

* * * * *